United States Patent [19]

Tsuchihashi et al.

[11] Patent Number: 5,511,631
[45] Date of Patent: Apr. 30, 1996

[54] RUNNING CONTROL STRUCTURE FOR A LAWN TRACTOR

[75] Inventors: Hironori Tsuchihashi; Osami Fujiwara; Tuyoshi Satou; Yoshikazu Togoshi; Toshihiko Hamada; Yoshihiro Kawahara; Niro Bando, all of Sakai, Japan

[73] Assignee: Kubota Corporation, Japan

[21] Appl. No.: 228,806

[22] Filed: Apr. 18, 1994

[30] Foreign Application Priority Data

May 20, 1993 [JP] Japan .................................. 5-118080
Aug. 31, 1993 [JP] Japan .................................. 5-215342
Sep. 27, 1993 [JP] Japan .................................. 5-238673

[51] Int. Cl.⁶ .................... B60K 17/354; B60K 23/08; G05G 13/00; G05G 1/14
[52] U.S. Cl. .................. 180/247; 192/114 R; 74/478; 74/512
[58] Field of Search ........................... 180/233, 244, 180/247; 74/478, 512; 192/114 R, 99 S

[56] References Cited

U.S. PATENT DOCUMENTS

| | | | |
|---|---|---|---|
| 2,096,151 | 10/1937 | Watt | 192/99 S |
| 2,099,594 | 11/1937 | Bloomquist | 192/99 S |
| 2,319,123 | 5/1943 | Gamble | 192/99 S |
| 3,092,229 | 6/1963 | Uher | 192/99 S X |
| 3,691,863 | 9/1972 | Shaffer | 74/478 |
| 4,248,331 | 2/1981 | Behrens | 192/114 R X |
| 4,441,596 | 4/1984 | Nahahara et al. | 74/478 X |
| 4,651,848 | 3/1987 | Kobayashi et al. | 180/247 |
| 4,711,317 | 12/1987 | Sakakiyama | 180/247 X |
| 4,811,811 | 3/1989 | Bergene | 180/247 X |
| 4,854,413 | 8/1989 | Kameda et al. | 180/247 |
| 4,928,782 | 5/1990 | Sommer | 180/247 X |
| 4,951,775 | 8/1990 | Kittle et al. | 180/247 X |
| 5,038,885 | 8/1991 | Sato et al. | 180/247 |
| 5,044,458 | 9/1991 | Schwarz et al. | 180/247 X |
| 5,159,847 | 11/1992 | Williams et al. | 180/247 X |
| 5,183,132 | 2/1993 | Fujisawa | 180/247 |
| 5,275,253 | 1/1994 | Sperduti et al. | 180/247 X |
| 5,330,030 | 7/1994 | Eastman et al. | 180/247 X |
| 5,332,060 | 7/1994 | Sperduti et al. | 180/247 X |
| 5,380,255 | 1/1995 | Brissenden et al. | 180/247 X |
| 5,411,110 | 5/1995 | Wilson et al. | 180/247 |

FOREIGN PATENT DOCUMENTS 471305  6/1992  Japan .

Primary Examiner—Margaret A. Focarino
Assistant Examiner—F. Zeender
Attorney, Agent, or Firm—Webb Ziesenheim Bruening Logsdon Orkin & Hanson

[57] ABSTRACT

A running control structure for a lawn tractor switchable between a two-wheel drive mode and a four-wheel drive mode. The control structure includes a first driving device for driving a first pair of wheels, a second driving device for driving a second pair of wheels, and a clutch mechanism for switching the second driving device between a driving state and a non-driving state. The clutch mechanism has a controller for operating a clutch, and a spring for biasing the controller to a position corresponding to the non-driving state of the second driving device.

16 Claims, 12 Drawing Sheets

RUNNING CONTROL STRUCTURE FOR A LAWN TRACTOR

BACKGROUND OF THE INVENTION

1. Field of the Invention

The present invention relates to a propelling apparatus for a lawn tractor for selectively providing a two-wheel drive mode and a four-wheel drive mode.

2. Description of the Related Art

A front-mount lawn tractor, as shown in Japanese Utility Model Publication Kokai No. 4-71305, has dirigible rear wheels which can also be driven to run in a four-wheel drive mode. This provides an improved performance for running in adverse ground conditions or for running on uphill grounds. With an ordinary four-wheel drive structure, front and rear wheels are driven at different rates when making a turn. When making a small, sharp turn, the wheels tend to slip and damage lawn. Where protection of lawn is a primary consideration, a two-wheel drive structure is often employed to avoid slippage during a small, sharp turn although its running performance on uphill grounds may not be satisfactory.

Lawn tractors are used widely in parks and on golf courses. Such tractors are driven by many people in many different ways. There are persistent demands among those people for four-wheel drive tractors having a strong driving force effective for grass cutting operations on uneven grounds.

However, simply employing a conventional four-wheel drive structure would again pose the problem of slippage during a small, sharp turn. It is necessary to develop and equip a four-wheel drive structure that overcomes the above disadvantage (e.g. a transmission mechanism or a center differential whose drive speed is variable with a turning radius). However, such a structure is complicated and expensive.

SUMMARY OF THE INVENTION

A primary object of the present invention is to provide an improved drive structure which is basically similar to the conventional four-wheel drive structure, but is relatively simple and inexpensive, and yet lessens slippage during a small, sharp turn.

The above object is fulfilled, according to the present invention, by a running control structure for a lawn tractor switchable between a two-wheel drive mode and a four-wheel drive mode, comprising first wheel means, dirigible second wheel means, first drive means for driving the first wheel means, second drive means for driving the second wheel means, drive switching means for switching the second drive means between a driving state and a non-driving state, the drive switching means including control means for controlling the drive switching means, and biasing means for biasing the control means to a position corresponding to the non-driving state of the second drive means.

The above construction will be described in relation to one embodiment of the present invention. A lawn tractor having non-dirigible front drive wheels and dirigible rear wheels includes a rear wheel driving device, and a foot-operated switching device for switching the rear wheel driving device between a driving state and a free rotation state.

The two-wheel drive mode is selected on a relatively easy ground such as a flat ground or a gently sloping ground, to avoid slippage when making a turn. When a steep slope or a rough patch of grass is encountered, the four-wheel drive mode is selected to secure a sufficient propelling force. In the four-wheel drive mode, the tractor should be driven in a way to avoid a small, sharp turn as much as possible. That is, the two-wheel drive mode is employed as a basic running mode, with the four-wheel drive mode used only for conditions requiring the four-wheel drive mode. The two-wheel drive mode is reinstated as soon as unfavorable ground conditions are over. Such running pattern effectively avoids slippage due to four-wheel drive.

For this purpose, the present invention provides a foot-operated switch pedal for selecting the two-wheel drive mode or four-wheel drive mode. Switching between the two-wheel drive mode and four-wheel drive mode may be made freely while the driver holds a steering wheel firmly with both hands. The four-wheel drive mode may be employed only when required as noted above.

Since the rear wheel drive switching means is foot-operated, switching between the two-wheel drive mode and four-wheel drive mode may be effected while gripping the steering wheel reliably with both hands even on a ground sloping sideways.

Consequently, running performance on an uphill ground or the like is improved while avoiding damage done to grass by the rear wheels during a turn on a relatively flat ground. It is also easy to drive the tractor on a sideways sloping ground. Thus, the present invention provides a lawn tractor efficient in terms of both running performance and maneuverability.

In a preferred embodiment of the invention, the running control structure is operable to switch from the two-wheel drive mode to the four-wheel drive mode in response to a braking operation. This construction takes into account the fact that, while the foot-operated switch pedal facilitates drive switching, the pedal could be operated inadvertently. For example, the driver may cause the tractor to run on an uphill ground in the two-wheel drive mode, thinking that the four-wheel drive mode has been selected, with the result that the tractor slips on the uphill ground. It is also possible that the pedal is operated in error while running on an uphill ground in the four-wheel drive mode. With the two-wheel drive mode selected by mistake, the tractor could begin to slip downward on the uphill ground.

In such a situation, the driver tends to apply the brakes to stop the tractor. According to the above construction, switching is made to the four-wheel drive mode in response to a braking operation. Thus, the four-wheel drive mode is automatically established after start of the braking and before the tractor actually stops. Then, the tractor may slip downward only a minor distance, and may be stopped in a stable way.

In the preferred embodiment as a whole, a four-wheel drive lawn tractor is provided which may be driven selectively in the two-wheel drive mode and four-wheel drive mode to avoid slippage during a turn, and which establishes the four-wheel drive mode in response to a braking operation.

The construction for switching between the two-wheel drive mode and four-wheel drive mode with the foot-operated pedal, with the four-wheel drive mode selected in response to a braking operation, allows this four-wheel drive lawn tractor to use a conventional four-wheel drive transmission which is relatively simple and inexpensive. This lawn tractor has a sufficient driving power, while being steerable in a way to protect grass from damage due to slippage during a small turn.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

Embodiments of the present invention will be described hereinafter with reference to the drawings.

Figure 1:
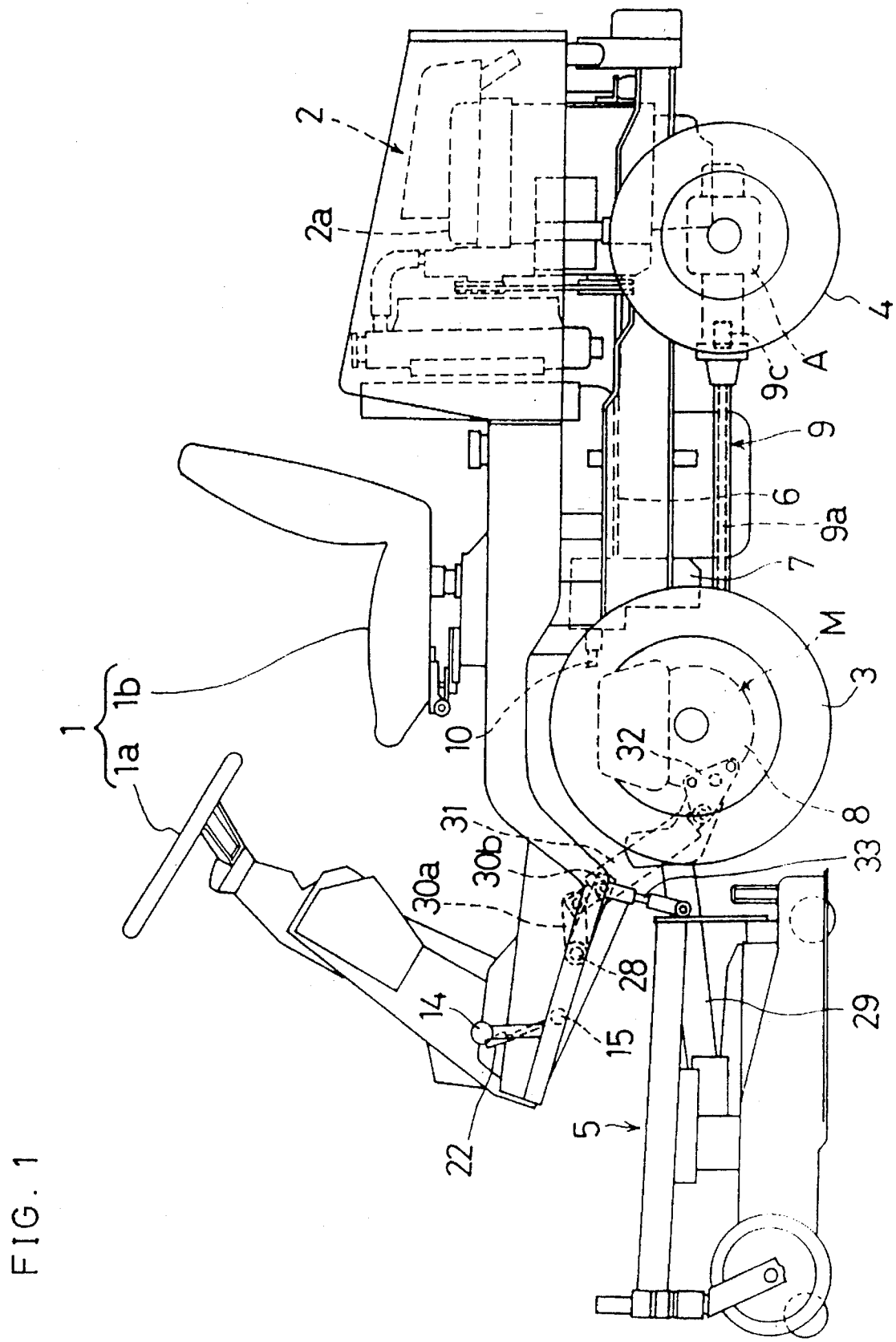
FIG. 1 is a side elevation of a lawn tractor according to the present invention.
Figure 2:
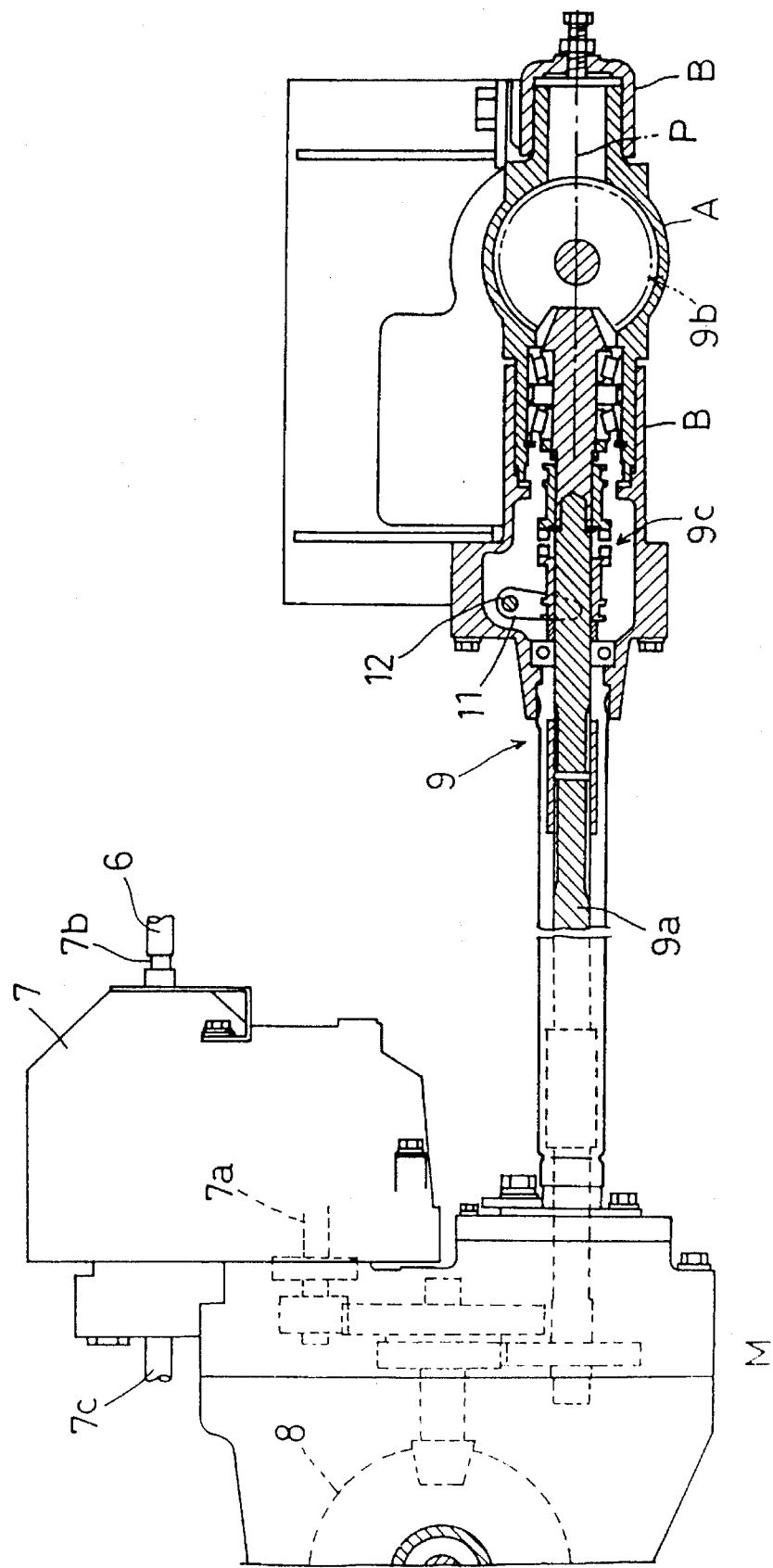
FIG. 2 is a side view, partly in section, of a propelling transmission system of the lawn tractor.

FIG. 1 shows a front-mount lawn tractor suitable for use on golf courses and the like. The tractor includes a driver's section 1 having a steering wheel 1a and a driver's seat 1b, a motor section 2, non-dirigible right and left front wheels 3, dirigible fight and left rear wheels 4 which are capable of rolling relative to a tractor chassis, and a mower unit 5 vertically movably connected to the chassis. As shown in FIGS. 1 and 2, output of an engine 2a is transmitted through a transmission shaft 6 to a hydrostatic stepless transmission 7. The transmission 7 has a variable speed output shaft 7a interlocked through gearing to a front differential 8 mounted in a transmission case M. Drive branched off within the transmission case M is transmitted to a rear wheel driving device 9. The hydrostatic stepless transmission 7 further includes an input shaft 7b, and a constant speed output shaft 7c extending therefrom and connected to the mower unit 5 through a transmission shaft 10.

Figure 3:
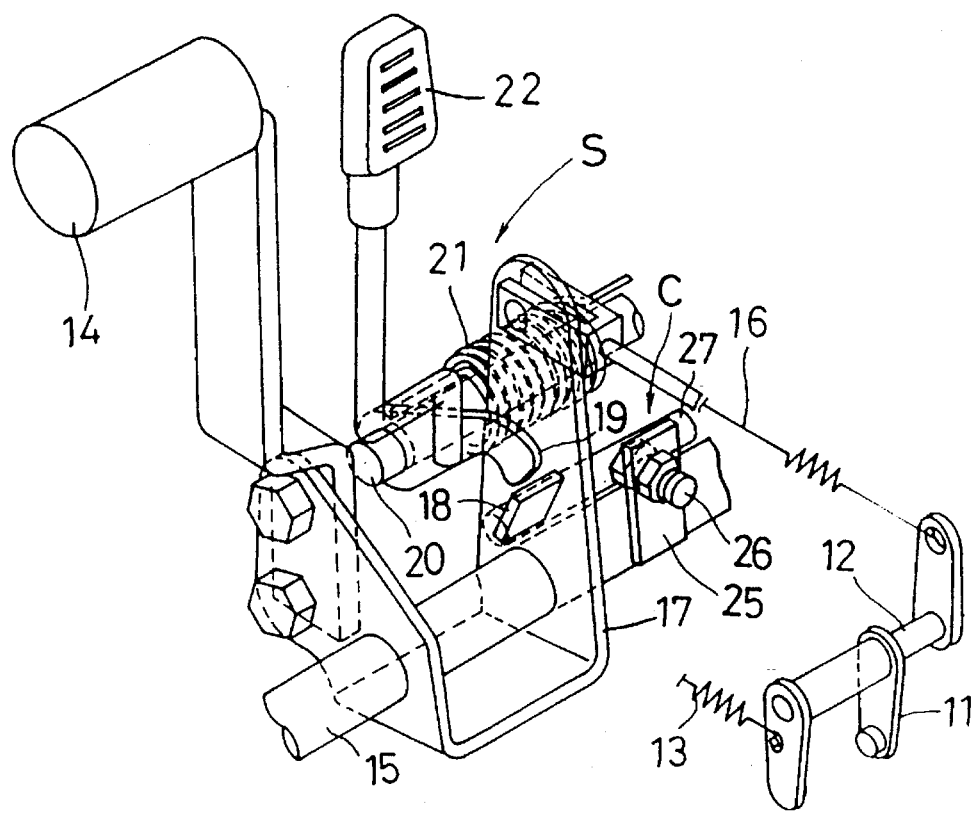
FIG. 3 is a perspective view of a running control structure in a first embodiment of the present invention.

The rear wheel driving device 9 includes a transmission shaft 9a connected through gearing to the variable speed output shaft 7a of the hydrostatic stepless transmission 7, an axle case A housing a mar differential 9b for driving the rear wheels 4, and a clutch 9c for connecting and disconnecting the transmission shaft 9a to/from the rear differential 9b. When running on a relatively flat ground, the changeover clutch 9c is disengaged to place the dirigible rear wheels 4 in freely rotatable state, so that only the front wheels 3 are driven. In this state, lawn is protected from damage due to slippage of the rear wheels 4 in a steering operation. The clutch 9c is engaged for running on an uphill ground or the like, whereby the rear wheels 4 as well as the front wheels 3 are driven in a four-wheel drive mode for the tractor to run reliably. The axle case A is supported by the chassis through front and rear bearings B to be capable of rolling about a horizontal axis P extending longitudinally of the tractor. The changeover clutch 9c is operable by a fork 11 pivotable about a pivotal axis 12. As shown in FIG. 3, the fork 11 is biased by a return spring 13 in a direction to disengage the clutch 9c. A clutch engaging, first pedal (corresponding to the switch pedal) 14 is disposed above a foot rest to be pivotable about a support shaft 15. The first pedal 14 is interlocked to the fork 11 through an interlocking member 16 such as a rod or wire. When the first pedal 14 is depressed, the changeover clutch 9c is engaged against the force of return spring 13, to establish the four-wheel drive mode.

The first pedal 14 is attached to a mounting member 17 having an engaging piece 18. The engaging piece 18 is engageable with a hook 19 pivotable about a support shaft 20 and biased by a torsion spring 21 in an engaging direction. The hook 19 is connected to a declutching, second pedal 22 for moving the hook 19 in a direction to disengage from the engaging piece 18.

The first and second pedals 14 and 22 are arranged adjacent each other to be depressible together with one foot. When the first pedal 14 is depressed to swing the engaging piece 18, a camming action between the engaging piece 18 and hook 19 causes the hook 19 to pivot against the torsion spring 21 and engage the engaging piece 18.

Figure 4:
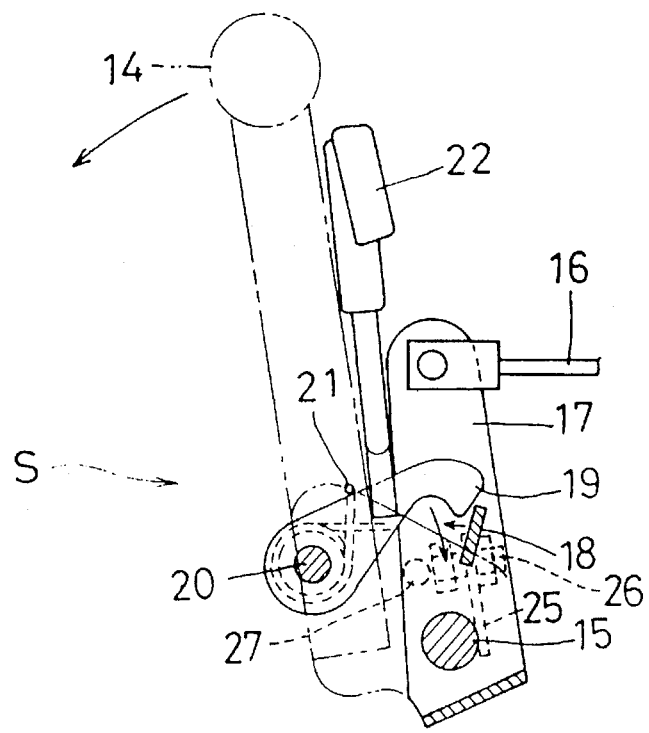
FIG. 4 is a side view of a clutch controller in a two-wheel drive mode in the first embodiment of the invention.
Figure 5:
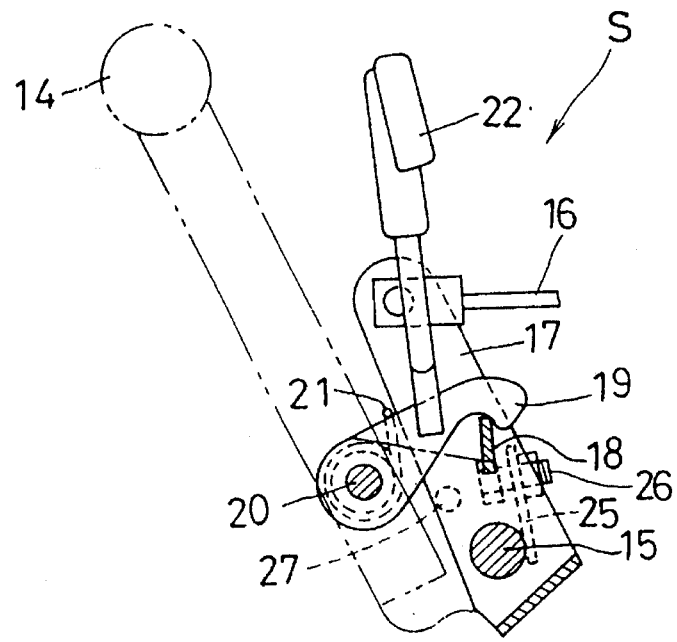
FIG. 5 is a side view of the clutch controller in a four-wheel drive mode in the first embodiment of the invention.
Figure 6:
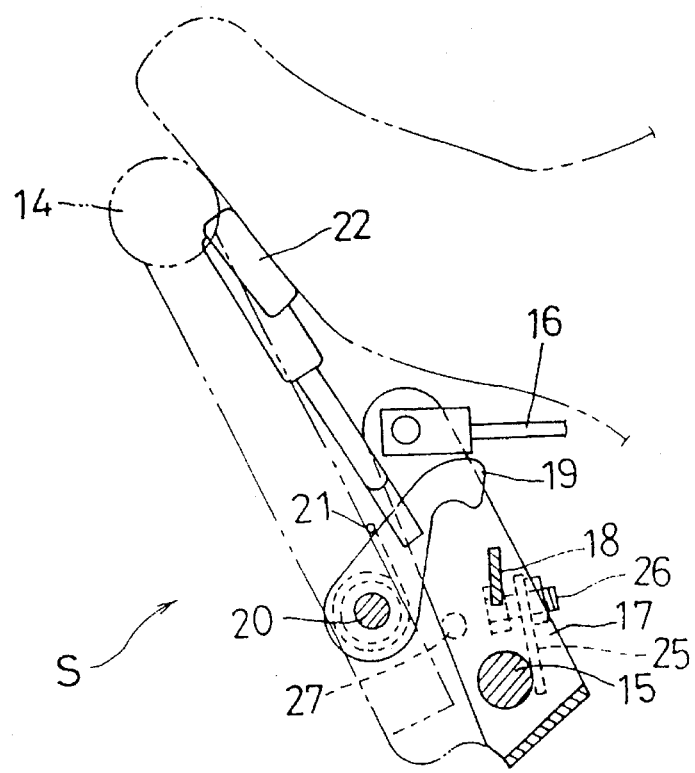
FIG. 6 is a side view of the clutch controller in a temporary four-wheel drive mode in the first embodiment of the invention.

That is, when the first pedal 14 is depressed from the position shown in FIG. 4, the changeover clutch 9c is engaged to provide the four-wheel drive mode to drive the front wheels 3 and rear wheels 4. As shown in FIG. 5, the four-wheel drive mode is maintained by locking action of the hook 19.

When the second pedal 22 is depressed in the four-wheel drive mode, the hook 19 is disengaged from the engaging piece 18. Then, the changeover clutch 9c is disengaged by the return spring 13 to reinstate a two-wheel drive mode to drive only the front wheels 3.

When the first and second pedals 14 and 22 are depressed together, the four-wheel drive mode is temporarily established only during depression thereof. When the foot is removed from the pedals 14 and 22, the two-wheel drive mode is reinstated to drive only the front wheels 3.

In sum, switching may be carried out by foot operation between driven state and freely rotatable state of the rear wheels 4. Thus, the two-wheel drive mode or four-wheel drive mode may be selected while reliably controlling the steering wheel 1a with both hands on a sideways sloping ground, for example.

Figure 7:
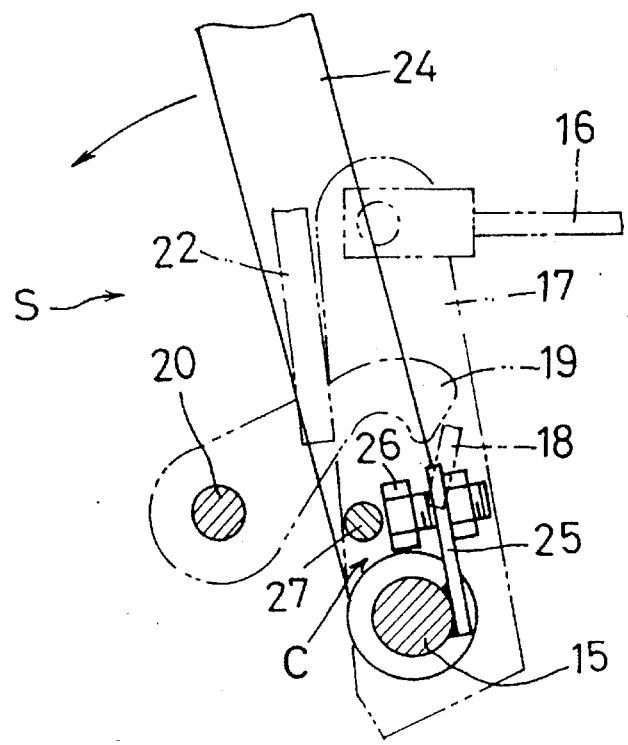
FIG. 7 is a side view showing details of an interlock switching mechanism in the first embodiment of the invention.
Figure 8:
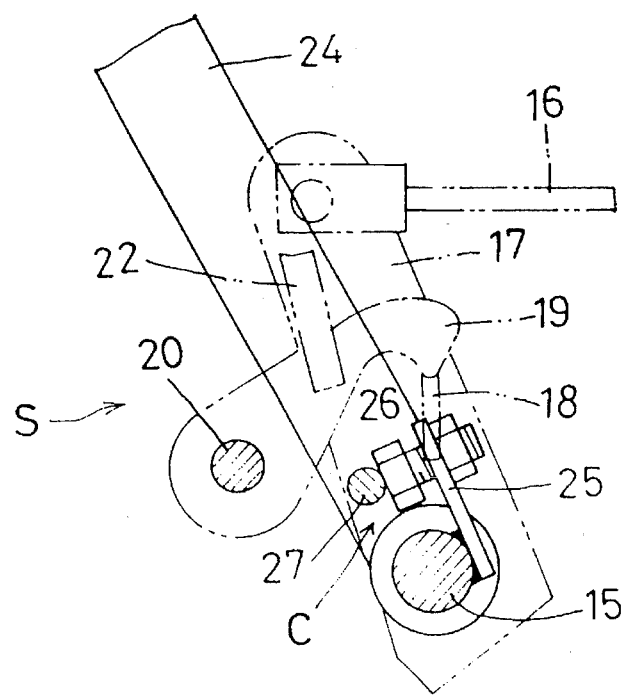
FIG. 8 is a side view of a position of the interlock switching mechanism at a braking time in the first embodiment of the invention.
Figure 9:
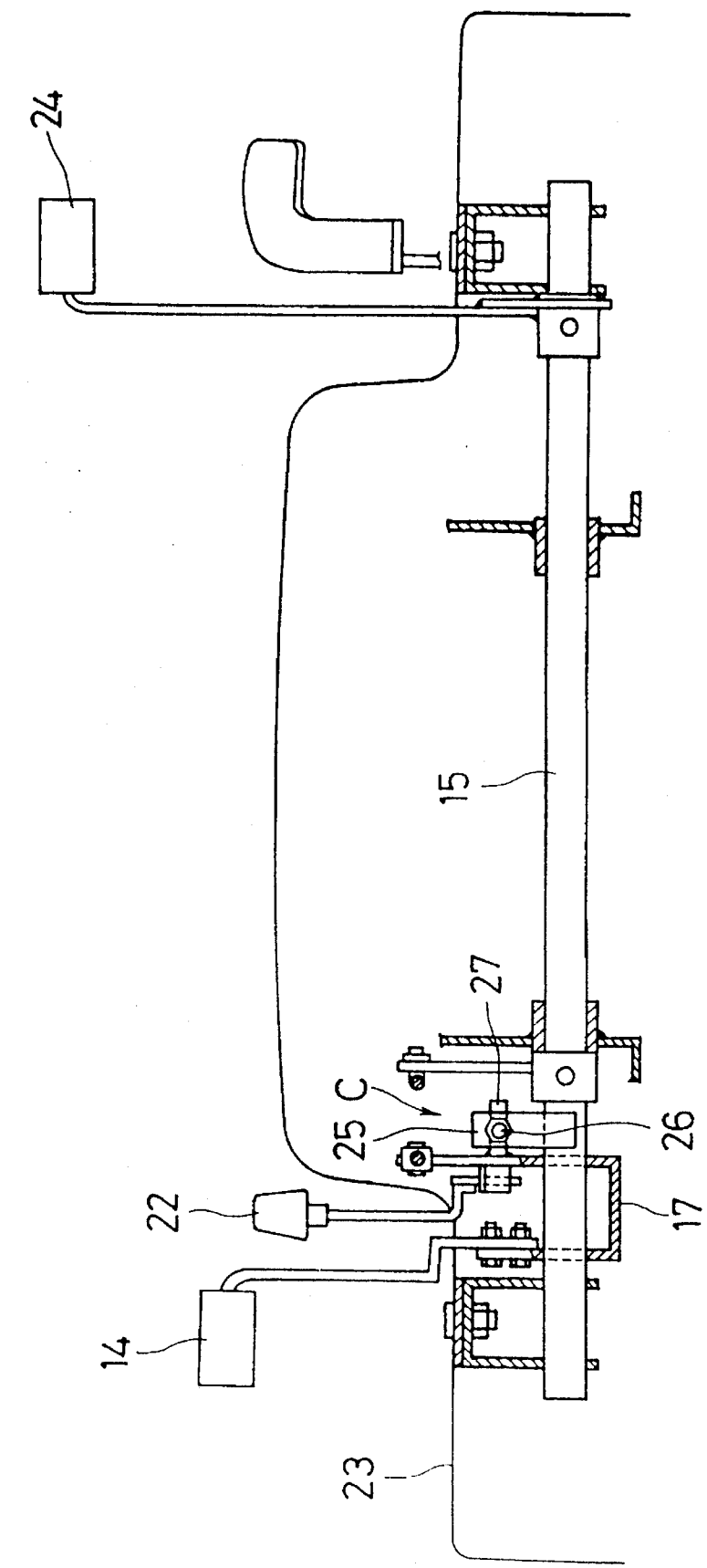
FIG. 9 is a cross section taken at a support shaft of foot rests in the first embodiment of the invention.

As shown in FIGS. 7 through 9, the support shaft 15 is a brake shaft extending transversely of the tractor from one foot rest 23 to the other. The support shaft 15 is rotatable with operation of a brake pedal 24 disposed above the other foot rest. Thus, the mounting member 17 is mounted on the support shaft 15 to be rotatable relative thereto.

An interlock switching mechanism C is provided between the support shaft 15 and mounting member 17 for interlocking the brake pedal 24 and changeover clutch 9c. With this mechanism C, changeover clutch 9c is switchable from two-wheel drive to four-wheel drive when the brake pedal 24 is depressed.

The interlock switching mechanism C includes a set bolt 26 meshed to a plate 25 attached to the support shaft 15, the set bolt 26 having a lock nut, and a pin 27 fixed to a side surface of the mounting member 17 and opposed to the set bolt 26 circumferentially of the support shaft 15. When the brake pedal 24 is depressed, the set bolt 26 pushes the pin 27 to depress the first pedal 14. Thus, whenever the tractor is braked, the changeover clutch 9c is switched to the four-wheel drive mode. When the brake pedal 24 is depressed to the full, the hook 19 rides on the engaging piece 18 as shown in FIG. 8 (or may be in a position before tiding). Consequently, the two-wheel drive mode is reinstated upon release of the brake pedal 24.

That is, when the tractor is braked, the four-wheel drive mode is established first, and then the brakes become operative. The two-wheel drive mode is reinstated when the braking is stopped.

As shown in FIG. 1, a link pivot axis 28 is disposed immediately rearwardly of the support shaft 15, to which an input-side, first arm 30a and output-side, right and left, second arms 30b are connected to be pivotable in unison. A lift cylinder 31 is connected between the first arm 30a and transmission case M. A lift rod 33 is connected between the second arms 30b and a lift arm 29 for suspending the mower unit 5.

Figure 10:
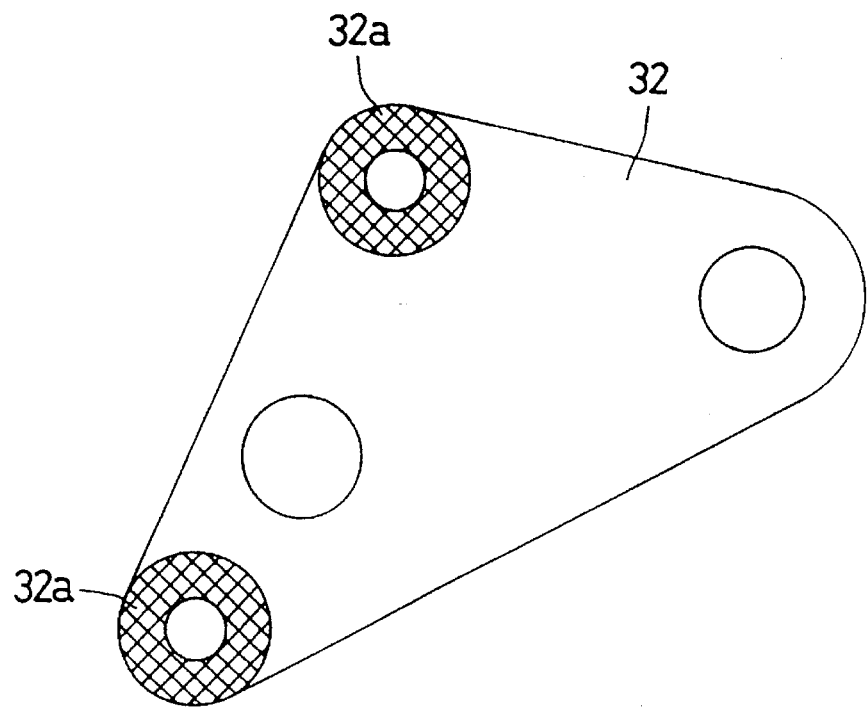
FIG. 10 is a side view of a cylinder mounting bracket in the first embodiment of the invention.
Figure 11:
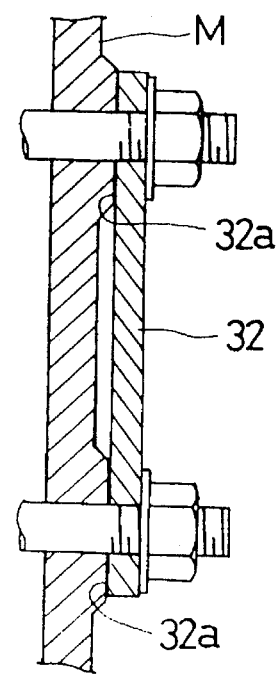
FIG. 11 is a sectional view showing a way the bracket is attached in the first embodiment of the invention.

As shown in FIGS. 1, 10 and 11, the lift cylinder 31 is supported by a pair of brackets 32 each fixed to the transmission case M by two bolts. Each bracket 32 has two knurled surfaces 32a for coupling to the transmission case M. These surfaces 32a are effective to prevent loosening of the bolts due to deformation under heavy loads of surfaces of the transmission ease M which is formed of an aluminum alloy.

Though not shown in the drawings, the brakes may act on the four wheels simultaneously or may act only on the front wheels or rear wheels. The first pedal 14 may be locked to the depressed position when the brake pedal 24 is depressed to the full, so that the four-wheel drive mode may be maintained after release of the brake pedal 24.

In this embodiment, the interlock switching mechanism C is provided between the support shaft 15 and mounting member 17. For example, the pin 27 may be interlocked directly to the changeover clutch 9c through a separate control wire, instead of using the mounting member 17.

The specific construction of the rear wheel driving device 9 may suitably be varied, be it mechanical, hydraulic or otherwise. In accordance with the specific construction of the rear wheel driving device 9, the foot-operated control for selecting the driven state or freely rotatable state of the rear wheels 4 is variable as appropriate. Such varied constructions are collectively called a rear wheel drive switching device S herein.

The foregoing embodiment includes the biasing device such as the return spring 13 for biasing the control section of the rear wheel drive connecting and disconnecting devices 14 and 22 to maintain the rear wheels 4 in the freely rotatable state. Such biasing device provides excellent operability for switching between two-wheel drive mode and four-wheel drive mode. However, the above embodiment may be modified such that the biasing device 13 is operable to maintain the rear wheels 4 in the driven state. In a further modification, the first pedal 14 may be adapted depressible backward as well as forward, thereby allowing the second pedal 22 to be omitted.

[Second Embodiment]

Figure 13:
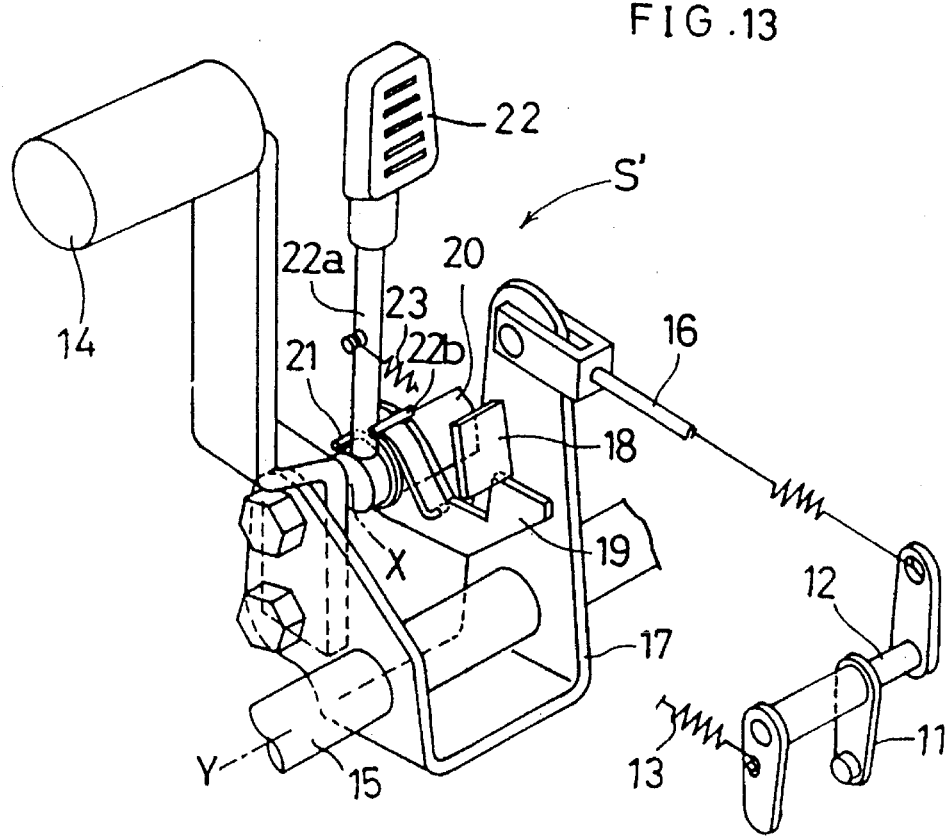
FIG. 13 is a perspective view of a clutch controller in the second embodiment of the invention.

The rear wheel driving device 9 may be constructed as shown in FIG. 13.

A lock pedal 22 is disposed at a side of a switch pedal 14 and attached to a second support shaft 20 having an axis X displaced from a pivotal axis Y of the switch pedal 14. The switch pedal 14 is attached to a mounting member 17 having an engaging piece 18. The second support shaft 20 has a lock piece 19 loosely mounted thereon for engaging the engaging piece 18. The lock piece 19 is biased by a torsion spring 21 in a direction to pivot upward about the second support shaft 20 toward the engaging piece 18. The lock pedal 22 is attached to a support 22a having a stopper pin 22b fixed thereto for defining an upper limit of returning pivotal movement. These components constitute a drive mode switching mechanism S'.

The engaging piece 18 and lock piece 19 are in such a positional relationship that, when the two pedals 14 and 22 are depressed a predetermined amount together until the changeover clutch 9c is engaged, the lock piece 19 and engaging piece 18 engage each other to maintain the two pedals 14 and 22 in the clutch engaging position.

When the switch pedal 14 alone is depressed further than the clutch engaging position, the engaging piece 18 and lock piece 19 are disengaged to allow the lock pedal 22 to return to an original position. The stopper pin 22b is disposed in a position to define the limit of return movement of the lock piece 19 under the biasing force.

The functions of the drive mode switching mechanism S' will be described next.

Figure 14:
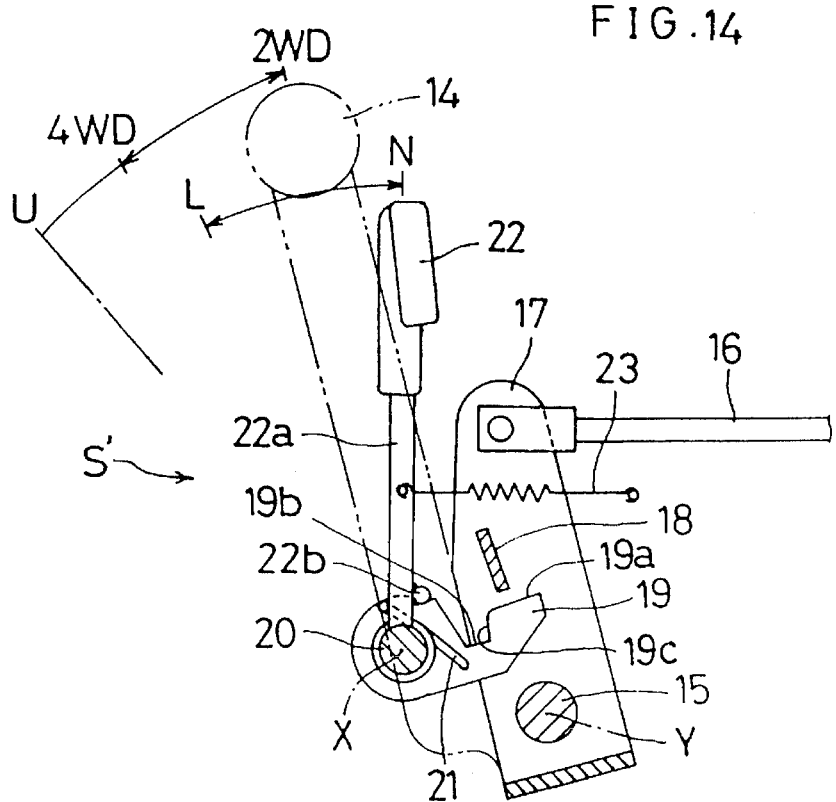
FIG. 14 is a side view of the clutch controller in a two-wheel drive mode in the second embodiment of the invention.

(1) Two-wheel Drive Mode:

When, as shown in FIG. 14, the two pedals 14 and 22 are free from a depressing force, with the switch pedal 14 lying in a 2 WD position and the lock pedal 22 in an N position, the changeover clutch 9c is disengaged to provide a two-wheel drive mode for driving the front wheels 3. At this time, the lock piece 19 is back in contact with the stopper pin 22b.

(2) First Four-Wheel Drive Mode (in which 4WD is provided only during depression):

When the switch pedal 14 is depressed from the 2WD position to a 4WD position as shown in FIG. 14, the clutch 9c is engaged to provide a four-wheel drive mode in which drive is transmitted also to the rear wheels 4. Upon release, the switch pedal 14 returns to the 2WD position under the force of return spring 13.

Figure 15:
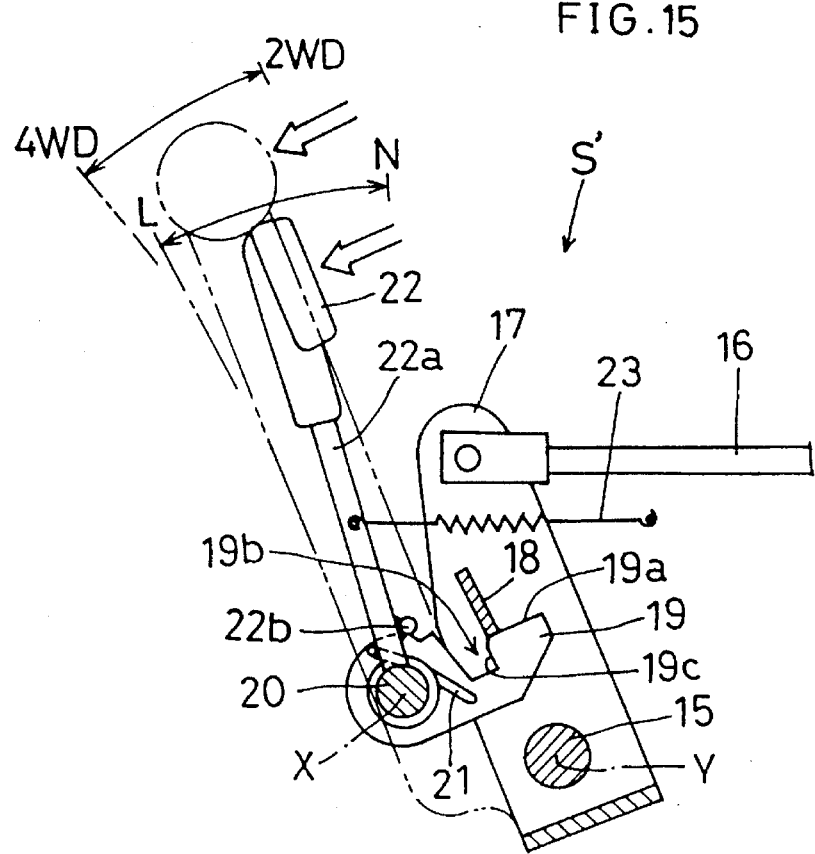
FIG. 15 is a side view of the clutch controller with two pedals depressed together in the second embodiment of the invention.

(3) Second Four-Wheel Drive Mode (in which 4WD is maintained after release of the pedals):

When the switch pedal 14 and lock pedal 22 are depressed together from the positions shown in FIG. 14, the lock pedal 22 pivots through a larger angle than the switch pedal 14, as shown in FIG. 15, which is due to the displacement between the axes of first and second support shafts 15 and 20. Upon depression to a certain degree, an upper surface of a hook portion 19a at a distal end of the lock piece 19 contacts a lower surface of the engaging piece 18.

Figure 16:
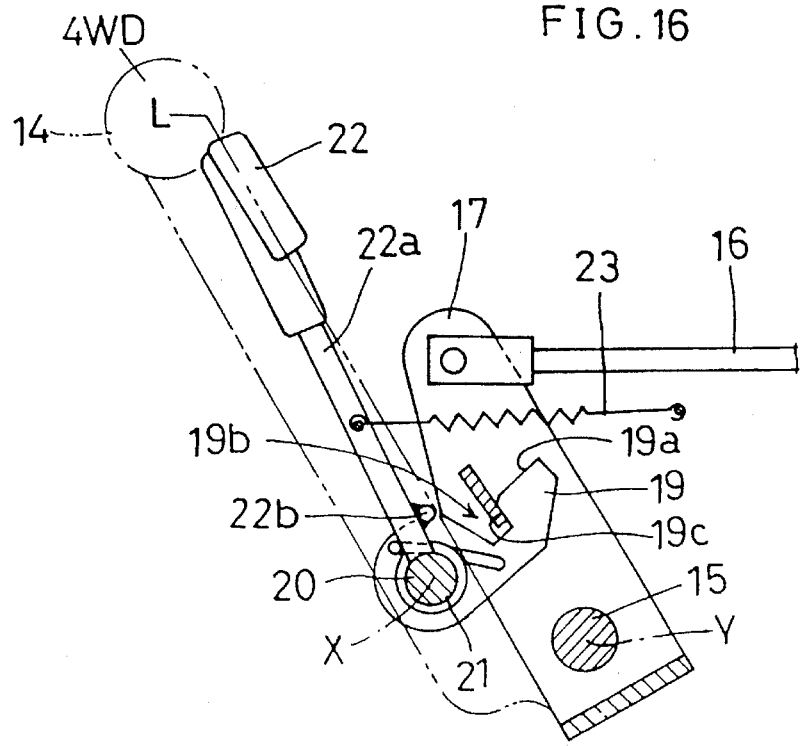
FIG. 16 is a side view of the clutch controller in a second four-wheel drive mode in the second embodiment of the invention.

As the two pedals 14 and 22 are further depressed together, the lock piece 19 contacting the engaging piece 18 pivots downward relative to the lock pedal 22 and away from the stopper pin 22b, with the engaging piece 18 approaching the second support shaft 20. When the engaging piece 18 reaches a recess 19b of the lock piece 19, the lock piece 19 separated from the stopper pin 22b pivots upward under the force of torsion spring 21. Then, as shown in FIG. 16, the engaging piece 18 fits into the recess 19b. When the driver removes his or her foot from the two pedals 14 and 22, a triangular arrangement of a contact between the engaging piece 18 and an end surface 19c of the recess 19b and the displaced axes X and Y prevents return movement of the two pedals 14 and 22. The switch pedal 14 is retained in the 4WD position, and the lock pedal 22 in a lock position L, thereby maintaining the four-wheel drive mode.

Figure 17:
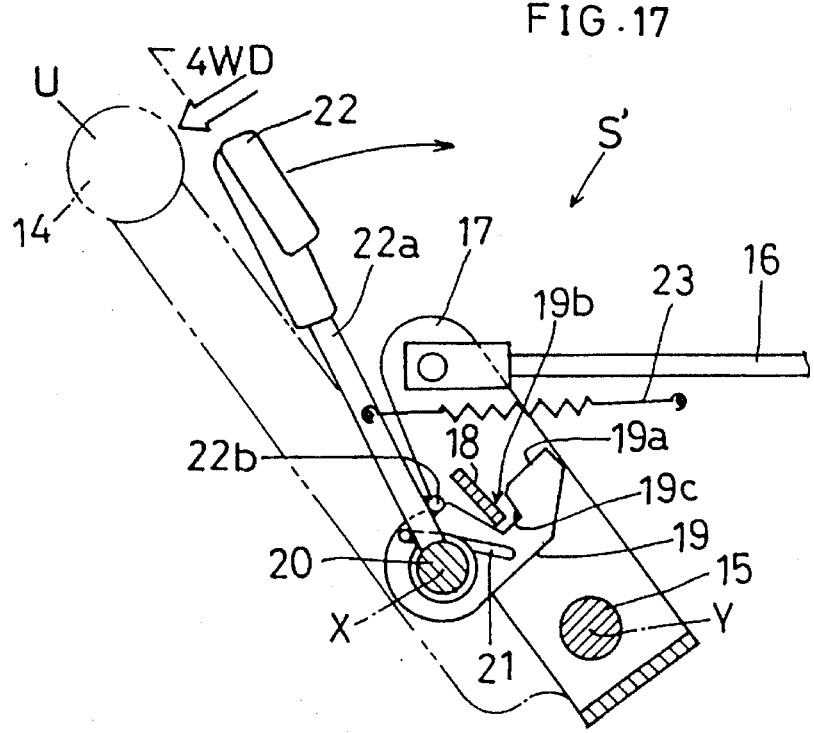
FIG. 17 is a side view of the clutch controller in the second embodiment of the invention, showing an operation to cancel the second four-wheel drive mode.

(4) Return from Second Four-Wheel Drive Mode to Two-Wheel Drive Mode:

When the switch pedal 14 alone is further depressed from the second four-wheel drive position shown in FIG. 16 to an unlock position U, the engaging piece 18 moves out of contact with the end surface 19c of the recess 19b formed in the lock piece 19 as shown in FIG. 17. Thereupon only the lock pedal 22 is returned by the return spring 23 from the lock position L to the N position to disengage the engaging piece 18 and lock piece 19. Thus, when the driver's foot is removed from the switch pedal 14 in the unlock position U, the return spring 13 returns the switch pedal 14 to the 2WD position shown in FIG. 14.

Thus, switching may be carried out by foot operation between driven state and freely rotatable state of the rear wheels 4. The temporary four-wheel drive mode may be selected by depressing one of the pedals. The tractor may be locked to the four-wheel drive mode only by depressing the two pedals simultaneously. The two-wheel drive mode or four-wheel drive mode may be selected while reliably controlling the steering wheel 1a with both hands on a sideways sloping ground.

Figure 12:
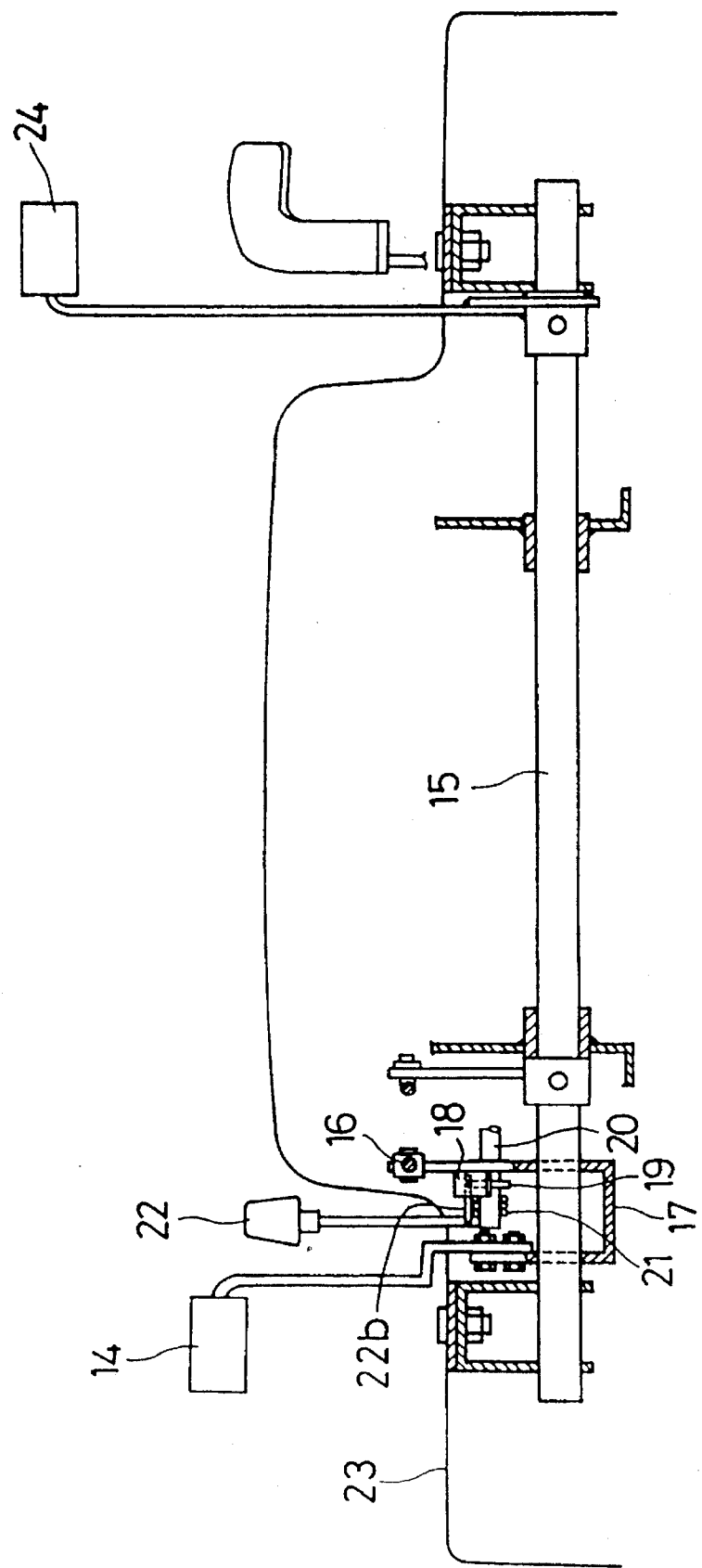
FIG. 12 is a cross section taken at a support shaft of foot rests in a second embodiment of the invention.

As shown in FIG. 12, the support shaft 15 is a brake shaft extending transversely of the tractor from one foot rest 23 to the other. The support shaft 15 is rotatable with operation of a brake pedal 24 disposed above the other foot rest. Thus, the mounting member 17 is mounted on the support shaft 15 to be rotatable relative thereto.

[Third Embodiment]

Figure 18:
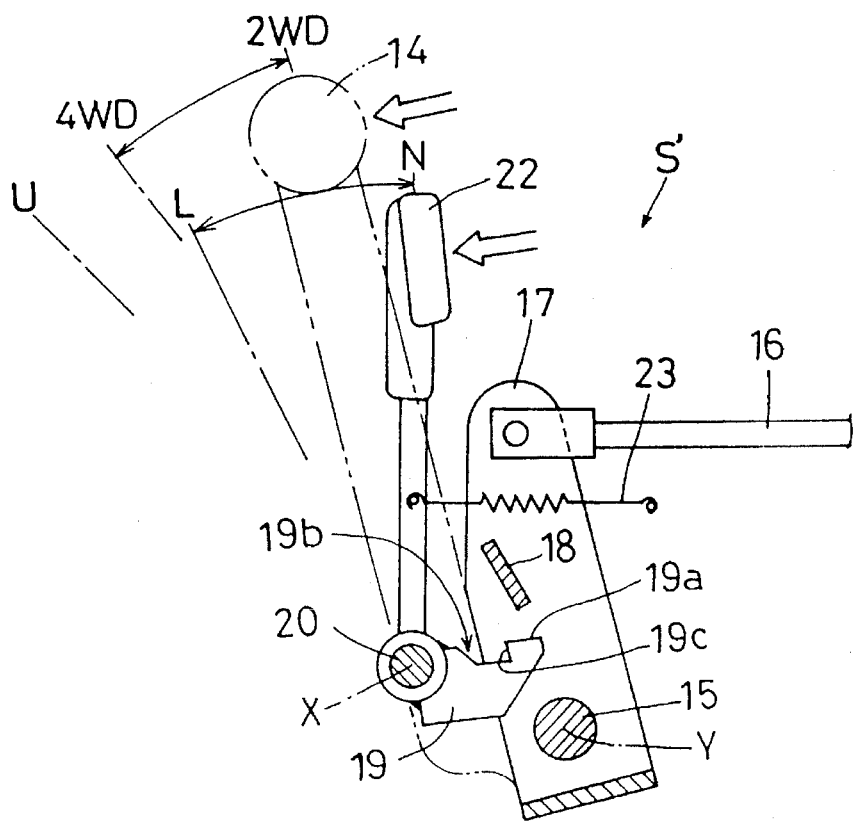
FIG. 18 is a side view of a clutch controller in a third embodiment of the invention.

The drive mode switching mechanism S' may be constructed as shown in FIG. 18. In this embodiment, the lock piece 19 is fixed to the second support shaft 20 so that the lock pedal 22 and lock piece 19 are pivotable together. The torsion spring 21 and stopper pin 22b are omitted from this embodiment. The other aspects are the same as in the second embodiment.

According to this construction, the functions (1), (2) and (4) are the same as in the second embodiment, and the function (3) is different.

Figure 19:
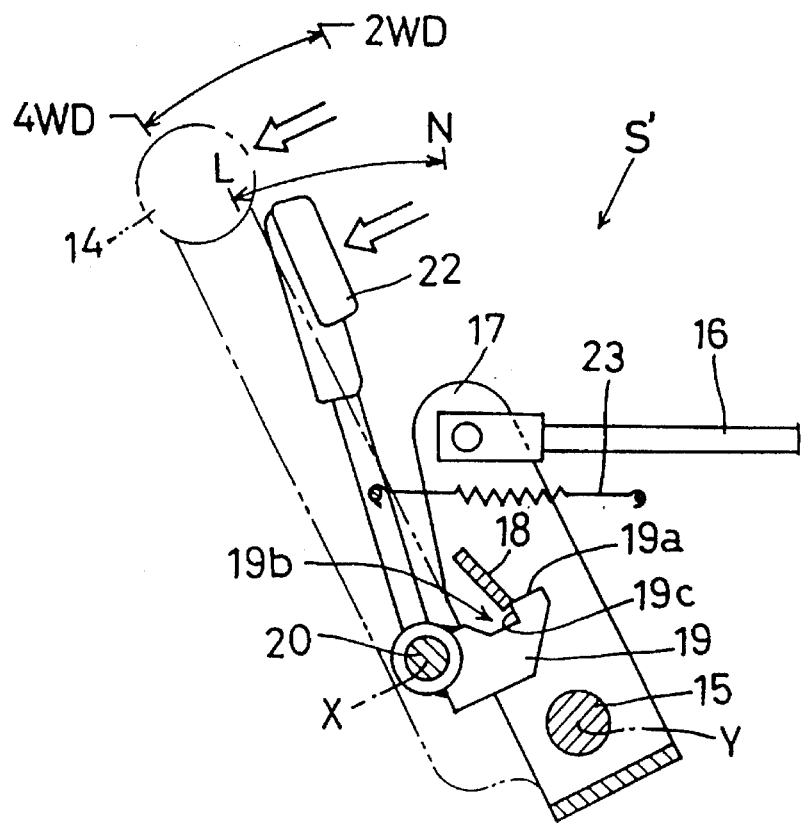
FIG. 19 is a side view of the clutch controller with two pedals depressed together in the third embodiment of the invention.
Figure 20:
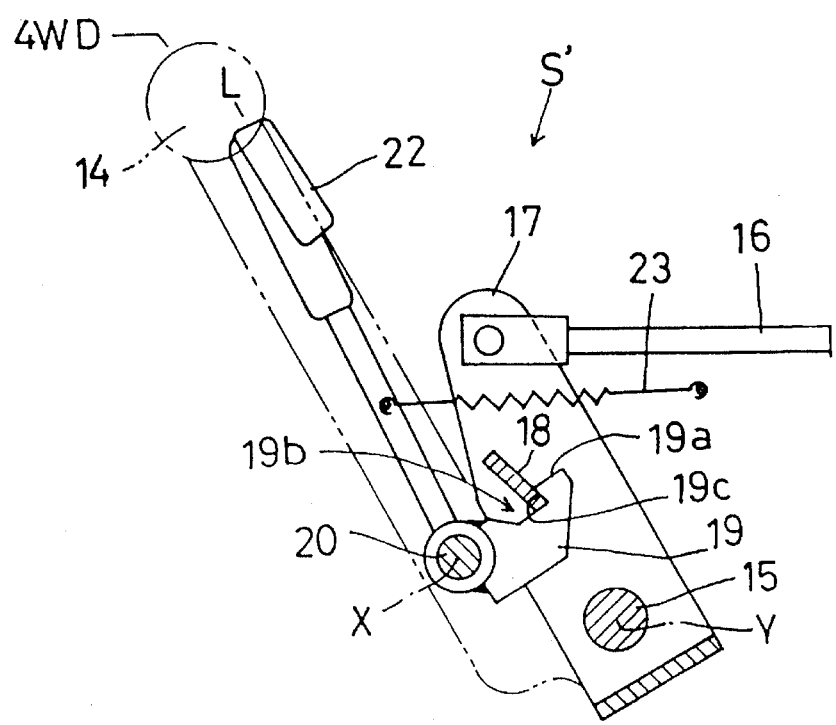
FIG. 20 is a side view of the clutch controller in a second four-wheel drive , mode in the third embodiment of the invention.

FIGS. 18 through 20 show an operating sequence including a variation in the positional relationship between the engaging piece 18 and lock piece 19 accompanying depression of the switch pedal 14 and lock pedal 22. In the state shown in FIG. 19 corresponding to FIG. 15 for the second embodiment, the lock pedal 22 is temporarily raised relative to the switch pedal 14 in the course of their simultaneous depression, since the lock piece 19 is not pivotable relative to the second support shaft 20. The other functions are the same as in the second embodiment.

In the second embodiment, the lock piece 19 is biased by the torsion spring 21 toward the engaging piece 18. In the third embodiment, this is achieved by the return spring 23 for biasing the lock pedal 22. The lock pedal 22 itself returned to the N position plays the part of the stopper in the second embodiment for defining the limit for return movement of the engaging piece 18 or lock piece 19.

The third embodiment may be modified such that the lock piece 19 is attached in a vertically reversed posture to the switch pedal 14, with the engaging piece 18 attached to the lock pedal 22.

The present invention is applicable to various other working vehicles such as other types of tractor and transport vehicles.

What is claimed is:

1. A running control structure for a lawn tractor switchable between a two-wheel drive mode and a four-wheel drive mode, comprising:

first wheel means;

second wheel means;

first drive means for driving said first wheel means;

second drive means for driving said second wheel means;

drive switching means for switching said second drive means between a driving state and a non-driving state, said drive switching means including control means for controlling said drive switching means, said control means including a foot-operated control pedal; and biasing means for biasing said control means to a position corresponding to said non-driving state of said second drive means, wherein said drive switching means includes a lock mechanism for maintaining said second wheel means in a driven state, wherein said drive switching means includes an unlocking mechanism for unlocking said lock mechanism, wherein said control pedal and said unlocking mechanism are depressible together to maintain said second wheel means in said driven state while maintaining said lock mechanism in an inoperative position, and wherein said control pedal and said unlocking mechanism are separately operable by an operator.

2. A running control structure as defined in claim 1, wherein said first wheel means includes front wheels, and said second wheel means includes rear wheels.

3. A running control structure as defined in claim 1, wherein said lock mechanism is automatically operable when said control pedal is depressed a predetermined amount.

4. A running control structure as defined in claim 1, wherein said unlocking mechanism includes a foot-operated unlocking pedal.

5. A running control structure as defined in claim 1, wherein said lock mechanism includes a foot-operated lock pedal.

6. A running control structure as defined in claim 1, further comprising brakes for stopping said lawn tractor, said brakes being connected to said drive switching means to switch said second wheel means from a non-driven state to a driven state.

7. A running control structure as defined in claim 1, wherein said control pedal includes an engageable member pivotable with a surface of said control pedal and said unlocking mechanism includes an engaging member pivotable with a surface of said unlocking mechanism for engaging said engageable member.

8. A running control structure as defined in claim 7, wherein said engaging member includes a cam surface for interacting with said engageable member when said control pedal is depressed, thereby establishing an engagement between said engaging member and said engageable member.

9. A running control structure for a lawn tractor switchable between a two-wheel drive mode and a four-wheel drive mode, comprising:

first wheel means;

dirigible second wheel means;

first drive means for driving said first wheel means;

second drive means for driving said second wheel means; drive switching means for switching said second drive means between a driving state and a non-driving state, said drive switching means including control means for controlling said drive switching means;

biasing means for biasing said control means to a position corresponding to said non-driving state of said second drive means; and a control pedal, wherein said first wheel means includes front wheels, and said second wheel means includes rear wheels, wherein said drive switching means includes a lock mechanism for maintaining said rear wheels in a driven state, said drive switching means includes an unlocking mechanism for undoing said lock mechanism, said unlocking mechanism includes a foot-operated unlocking pedal, and said control pedal and said unlocking pedal have tread surfaces disposed adjacent each other, so that said control pedal and said unlocking pedal are depressible together to maintain said rear wheels in said driven state while maintaining said lock mechanism in an inopertive position.

10. A running control structure as defined in claim 9, wherein said control pedal includes an engageable member pivotable with the tread surface of said control pedal, and said unlocking pedal includes an engaging member pivotable with the tread surface of said unlocking pedal for engaging said engageable member.

11. A running control structure as defined in claim 10, wherein said engaging member includes a cam surface for interacting with said engageable member when said control pedal is depressed, to cause pivotal movement of said unlocking pedal, thereby establishing an engagement between said engaging member and said engageable member.

12. A running control structure for a lawn tractor switchable between a two-wheel drive mode and a four-wheel drive mode, comprising:

first wheel means;

dirigible second wheel means;

first drive means for driving said first wheel means;

second drive means for driving said second wheel means; drive switching means for switching said second drive means between a driving state and a non-driving state, said drive switching means including control means for controlling said drive switching means;

biasing means for biasing said control means to a position corresponding to said non-driving state of said second drive means; and a control pedal, wherein said first wheel means includes front wheels, said second wheel means includes rear wheels, said drive switching means includes a lock mechanism for maintaining said rear wheels in a driven state, said lock mechanism includes a foot-operated lock pedal, and said lock mechanism is automatically operable when said control pedal and said lock pedal are depressed a first predetermined amount.

13. A running control structure as defined in claim 12, wherein said lock mechanism in an operative position is automatically canceled when said control pedal is further depressed a second predetermined amount.

14. A running control structure as defined in claim 12, wherein said control pedal and said lock pedal are pivotable about axes spaced a predetermined distance from each other, respectively, said control pedal including an engageable member pivotable therewith, said lock pedal including a lock piece pivotable relative thereto about the same axis as said lock pedal, said lock piece defining an engaging surface for engaging said engageable member based on said distance when said control pedal and said lock pedal are depressed said first predetermined amount.

15. A running control structure as defined in claim 14, wherein said lock piece is biased toward said engageable member.

16. A running control structure as defined in claim 15, wherein said lock pedal includes a stopper piece for setting a relative pivoting position between said lock piece and said control pedal to at least a predetermined angle.

* * * * *